UNITED STATES PATENT OFFICE.

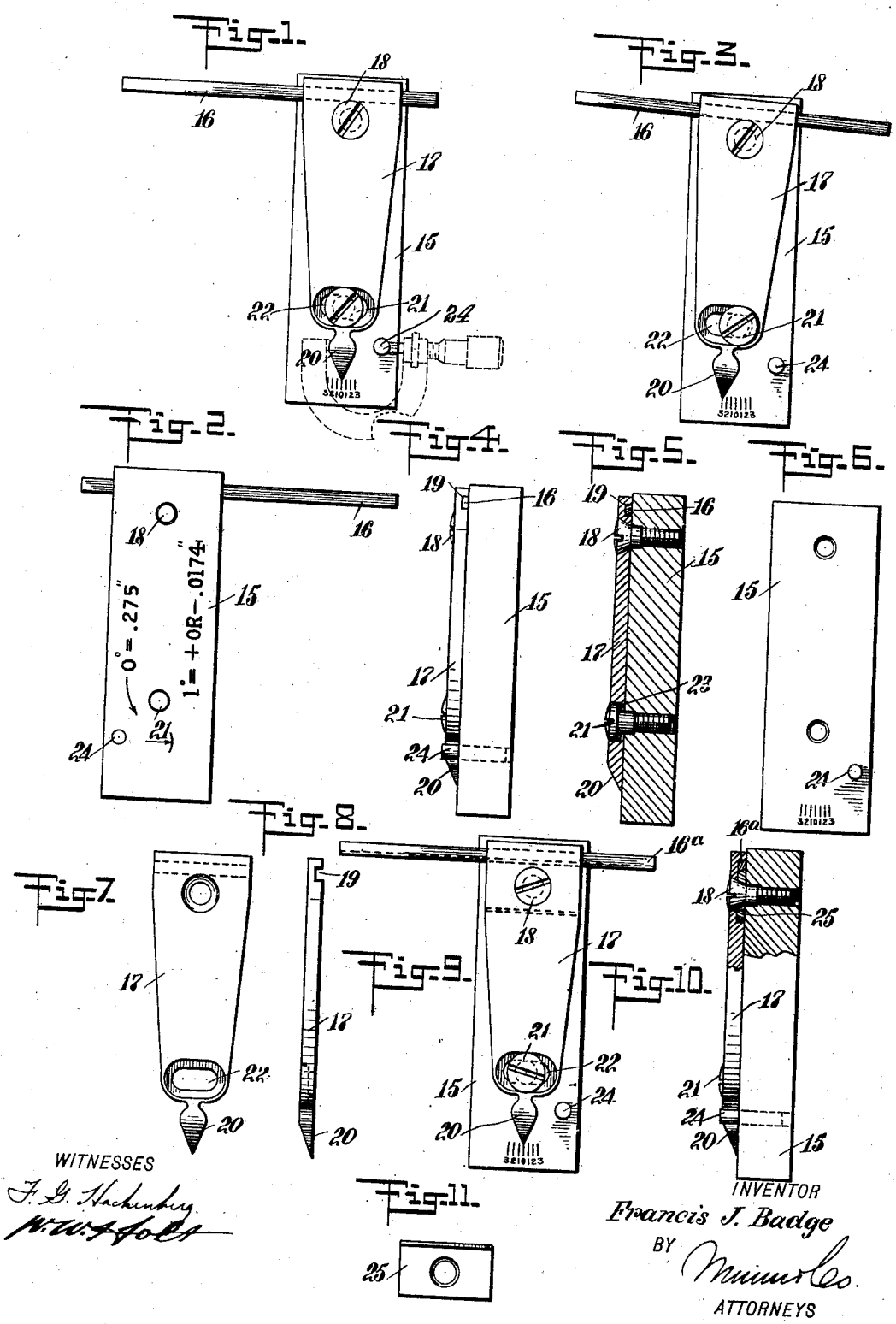

FRANCIS JAMES BADGE, OF NEW YORK, N. Y.

DIE-MAKER'S SQUARE.

984,995.

Specification of Letters Patent. Patented Feb. 21, 1911.

Application filed August 5, 1909. Serial No. 511,318.

*To all whom it may concern:*

Be it known that I, FRANCIS J. BADGE, a subject of the King of Great Britain, and a resident of the city of New York, borough of Brooklyn, in the county of Kings and State of New York, have invented a new and Improved Die-Maker's Square, of which the following is a full, clear, and exact description.

The invention is an improvement in squares such as are used in determining the clearance on dies, by which I mean the angle of the sides of the die impression, and has in view a square in which the blade can be accurately and readily set at any angle to the stock within certain limits. This I accomplish by providing the stock of the square with a pivotally-supported arm on which the blade of the square is carried, the arm having an index finger, and the stock being further provided with a member or projection arranged in a definite position on the stock in calipering relation to the finger, whereby the finger may be precisely adjusted with a micrometer gage.

Reference is to be had to the accompanying drawings forming a part of this specification, in which similar characters of reference indicate corresponding parts in all the views.

Figure 1 is a front face view of a square constructed in accordance with my invention; Fig. 2 is a rear face view of the same; Fig. 3 is a view similar to Fig. 1, showing the pivotal arm and the blade of the square shifted to relatively different positions; Fig. 4 is an edge view of the square; Fig. 5 is a central longitudinal section through the stock of the square; Fig. 6 is a front face view of the stock with the arm and blade removed; Fig. 7 is a face view of the arm; Fig. 8 is an edge view of the same; Fig. 9 is a view similar to Fig. 1, illustrating a modified construction of the square; Fig. 10 is an edge view of the square shown in Fig. 9, partly in section; and Fig. 11 is a face view of a washer or plate entering into the construction of the square shown in Figs. 9 and 10.

Referring more especially to the square shown in Figs. 1 to 8 inclusive, the same embodies the usual stock 15 and blade 16. The blade instead of being assembled with the stock in the conventional way is carried on an arm 17, fulcrumed near that end adjacent to the blade on a screw 18 which is threaded into the stock, the blade passing through a groove 19 formed in the inner face of the arm transversely thereof and at the outer side of the screw. The arm 17 extends substantially the full length of the stock, and at its opposite end is provided with an index finger 20, the latter traversing a graduated scale on the stock, as shown. The zero of this scale is so arranged that when the index finger registers therewith the blade 16 is exactly at right-angles to the stock. A screw 21 threaded into the stock and passing through a slot 22 in the arm 17 adjacent to the index finger 20 serves to bind the arm to the stock and hold the index finger in any position of its adjustment. In order that the arm will not be moved in tightening the screw 21 a washer 23 is placed under the head of the screw and is received in the recess surrounding the slot. The blade 16 is made slightly thicker than the depth of the slot 19, so that when the fulcrum screw 18 is tightened the blade will be clamped to the stock and held against movement.

In order that the index finger may be accurately set in locating the blade at the desired angle to the stock, the latter is provided with a pin, shoulder or other projection 24, which is arranged at a known distance from the far side of the index finger when the latter is on the zero mark of the scale, this distance being indicated at a suitable point on the square, as shown in Fig. 2, also the chordal distance required to make a change of one degree to either side of the zero mark. In practice, this change in the length of the chord between the projection 24 and index finger, will be constant in moving the index finger from one degree to the next in view of the short portion of the arc of relatively long radius which the index finger traverses. This is further insured by having the projection and index finger rounded on their calipering faces or edges.

In using the square, the screws 18 and 21 are slightly loosened to permit of the movement of the arm 17. A micrometer gage is then placed against the outer side of the projection 24 and index finger and is adjusted until the reading is obtained for the angle desired. The screws are then tightened, when the square is in readiness for use. In determining the angle which the blade makes with the stock, the distance between the outer edges of the projection 24 and index finger is determined with the micrometer, and the chordal difference found reduced to degrees.

The construction of the square shown in Figs. 8, 9 and 10, differs from that described in that the groove corresponding to the groove 19 is widened to extend under the head of the screw 18, and a washer or plate 25 is introduced; also, the blade 16ª, corresponding to the blade 16, is beveled on its inner edge and conforms to the oppositely-beveled edge of the plate, as clearly shown in Fig. 10. The opening in the plate through which the screw 18 passes is countersunk to conform to the tapering head of the screw, and is arranged at that side of the threaded opening in the stock receiving the screw, away from the blade 16ª, so that when the screw is turned up to bind the arm to the stock it will also force the beveled edge of the washer against the blade, tending to force the blade against the bottom and outer edge of the groove, thus securely holding the blade in adjusted position. The beveled edge of the blade also enables the measurement of an angle to be accurately determined, since when such an edge is pressed against a die or other part it will bear on a line only.

Having thus described my invention, I claim as new and desire to secure by Letters Patent:

1. The combination in a square, of a stock, an index arm, a screw on which the arm is fulcrumed, carried by the stock and having a tapering portion, a blade arranged between the arm and stock and engaged by a shoulder of the arm, and a plate arranged between the arm and stock to press the blade to the shoulder of the arm under the action of the tapering portion of the screw.

2. The combination in a square, of a stock, an index arm having a groove on its inner face, a blade located in said groove, a plate arranged in the groove of the arm, and a screw on which the arm is fulcrumed, threaded into the stock and having means to press the plate against the blade and bind it to the arm.

3. The combination in a square, of a stock, an index arm having a groove in its inner face, a blade and a plate located in the groove, having abutting edges beveled in a direction to force the blade to the bottom of the groove under pressure of the plate, and a screw on which the arm is fulcrumed, carried by the stock and having means to force the plate toward the blade.

4. The combination in a square, of a stock having a scale, an arm fulcrumed intermediate its length on one side and adjacent to one end of the stock, a blade carried by the arm at one side of its fulcrum, the arm having an index finger coöperative with the scale at the opposite side of its fulcrum, the finger having a rounded side edge, and a calipering projection arranged on the stock at the opposite side of the finger from the said edge.

In testimony whereof I have signed my name to this specification in the presence of two subscribing witnesses.

FRANCIS JAMES BADGE.

Witnesses:
W. W. HOLT,
PHILIP D. ROLLHAUS.